(12) United States Patent
Leiserowitz et al.

(10) Patent No.: US 7,574,428 B2
(45) Date of Patent: Aug. 11, 2009

(54) GEOMETRY-BASED SEARCH ENGINE FOR NAVIGATION SYSTEMS

(75) Inventors: Eran Leiserowitz, Kiryat-Ono (IL); Alexander Fagin, Modiin (IL)

(73) Assignee: Telmap Ltd, Hertliya Pituach (IL)

( * ) Notice: Subject to any disclaimer, the term of this patent is extended or adjusted under 35 U.S.C. 154(b) by 212 days.

(21) Appl. No.: 11/384,262

(22) Filed: Mar. 21, 2006

(65) Prior Publication Data

US 2007/0083557 A1 Apr. 12, 2007

Related U.S. Application Data

(60) Provisional application No. 60/725,883, filed on Oct. 11, 2005.

(51) Int. Cl.
*G06F 17/30* (2006.01)
(52) U.S. Cl. .............................. 707/3; 701/208; 701/209
(58) Field of Classification Search ...................... 707/3; 701/200–226
See application file for complete search history.

(56) References Cited

U.S. PATENT DOCUMENTS

| | | | |
|---|---|---|---|
| 1,261,167 A | 4/1918 | Russell | |
| 1,435,663 A | 11/1922 | Russell | |
| 6,038,559 A | 3/2000 | Ashby et al. | |
| 6,393,415 B1 * | 5/2002 | Getchius et al. ............... | 707/2 |
| 6,408,307 B1 * | 6/2002 | Semple et al. ............ | 707/104.1 |
| 6,487,495 B1 * | 11/2002 | Gale et al. ................... | 701/209 |
| 6,609,062 B2 * | 8/2003 | Hancock ..................... | 701/200 |
| 6,643,650 B1 | 11/2003 | Slaughter et al. | |
| 6,650,998 B1 * | 11/2003 | Rutledge et al. ............. | 701/211 |
| 6,665,676 B2 * | 12/2003 | Twig et al. .................... | 707/10 |
| 6,678,535 B1 | 1/2004 | Narayanaswami | |
| 6,766,245 B2 * | 7/2004 | Padmanabhan ............. | 701/207 |
| 6,826,385 B2 | 11/2004 | Kujala | |
| 6,834,195 B2 | 12/2004 | Brandenberg et al. | |
| 6,854,115 B1 | 2/2005 | Traversat et al. | |
| 6,898,516 B2 | 5/2005 | Pechatnikov et al. | |
| 6,904,360 B2 | 6/2005 | Pechatnikov et al. | |
| 6,917,878 B2 | 7/2005 | Pechatnikov et al. | |
| 6,931,429 B2 | 8/2005 | Gouge et al. | |
| 6,934,755 B1 | 8/2005 | Saulpaugh et al. | |
| 6,970,869 B1 | 11/2005 | Slaughter et al. | |
| 7,031,983 B2 * | 4/2006 | Israni et al. .............. | 707/104.1 |

(Continued)

OTHER PUBLICATIONS

W. Jack Bouknight, "A Procedure for Generation of Three-dimensional Half-toned Computer Graphics Presentations", Communications of the ACM, vol. 13, No. 9, Sep. 1970, pp. 527-536.

(Continued)

*Primary Examiner*—Tim T. Vo
*Assistant Examiner*—Michelle Owyang
(74) *Attorney, Agent, or Firm*—D. Kligler I.P. Services Ltd.

(57) ABSTRACT

A computer-implemented method for determining a requested map location includes providing a database holding a plurality of map objects having respective descriptors and loci. A search query including one or more query terms that describe the requested map location is accepted. One or more matched map objects are identified in the database such that the respective descriptors of the matched map objects each match at least one of the query terms. The respective loci of the matched map objects are processed to determine the requested map location.

24 Claims, 4 Drawing Sheets

U.S. PATENT DOCUMENTS

| | | | |
|---|---|---|---|
| 7,103,854 | B2 * | 9/2006 | Fuchs et al. ............... 715/855 |
| 7,117,266 | B2 | 10/2006 | Fishman et al. |
| 7,158,878 | B2 * | 1/2007 | Rasmussen et al. ......... 701/208 |
| 7,231,405 | B2 * | 6/2007 | Xia ........................ 707/104.1 |
| 7,257,570 | B2 * | 8/2007 | Riise et al. .................... 707/3 |
| 7,353,114 | B1 * | 4/2008 | Rohlf et al. .................... 702/5 |
| 7,359,797 | B2 * | 4/2008 | Dorfman et al. ............ 701/207 |
| 7,373,246 | B2 * | 5/2008 | O'Clair ....................... 701/208 |
| 7,386,373 | B1 * | 6/2008 | Chen et al. ..................... 701/9 |
| 2002/0055924 | A1 * | 5/2002 | Liming ....................... 707/100 |
| 2002/0111146 | A1 | 8/2002 | Fridman et al. |
| 2003/0061211 | A1 * | 3/2003 | Shultz et al. ................... 707/3 |
| 2003/0117297 | A1 | 6/2003 | Obradovich et al. |
| 2004/0058652 | A1 | 3/2004 | McGregor et al. |
| 2004/0225665 | A1 * | 11/2004 | Toyama et al. ............. 707/100 |
| 2005/0021876 | A1 | 1/2005 | Asai et al. |
| 2005/0050035 | A1 * | 3/2005 | Ono ............................. 707/3 |
| 2006/0218114 | A1 * | 9/2006 | Weare et al. ................... 707/1 |

OTHER PUBLICATIONS

J. E. Bresenham, "Algorithm for Computer Control of a Digital Plotter", IBM Systems Journal, vol. 4, No. 1, 1965, pp. 25-30.

Binstock and Rex, "Metaphone: A Modern Soundex", in Practical Algorithms for Programmers, $1^{st}$ Edition, Addison-Wesley, Jun. 1995, pp. 160-170.

Lawrence Philips, "Hanging on the Metaphone. (a phonetic text-retrieval algorithm better than Soundex) (tutorial)", Computer Language, vol. 7, No. 12, Dec. 1990, 3 pages.

T. N. Gadd, "PHONIX: The algorithm", Program, vol. 24, No. 4, Oct. 1990, pp. 363-366.

Ulrich Pfeifer, et al., "Retrieval Effectiveness of Proper Name Search Methods", Information Processing and Management, vol. 32, No. 6, Nov. 1996, 15 pages.

Thomas H. Cormen, et al., "Introduction to Algorithms", $2^{nd}$ edition, MIT Press, Massachusetts, Sep. 2001, 5 pages 273-276.

Ralf Hinze, "Constructing Red-Black Trees", Proceedings of the Workshop on Algorithmic Aspects of Advanced Programming Languages (WAAAPL'99), Pans, France, Sep. 1999, pp. 1-12.

* cited by examiner

GEOMETRY-BASED SEARCH ENGINE FOR NAVIGATION SYSTEMS

CROSS-REFERENCE TO RELATED APPLICATIONS

This application claims the benefit of U.S. Provisional Patent Application 60/725,883, filed Oct. 11, 2005, which is incorporated herein by reference.

FIELD OF THE INVENTION

The present invention relates generally to map processing systems, and particularly to methods and systems for geometry-based identification of map locations.

BACKGROUND OF THE INVENTION

Various applications involve identifying and displaying geographical map locations. An exemplary application is a mobile navigation application that presents navigational information to a mobile user. Several mobile navigation systems and methods are known in the art. For example, U.S. Pat. No. 6,917,878, whose disclosure is incorporated herein by reference, describes a method for navigation that includes storing map data on a server. The map data includes vector information delineating roads in a map. A portion of the vector information corresponding to an area in which a user of a mobile client device is traveling is downloaded from the server to the client device. Approximate position coordinates of the user are found using a location-providing device associated with the client device. The approximate coordinates are corrected in the client device using the downloaded vector information, so as to determine a location of the user on one of the roads in the map. A navigation aid is provided to the user of the client device based on the determined location.

As another example, U.S. Pat. No. 6,898,516, whose disclosure is incorporated herein by reference, describes a method for displaying a map on a mobile client device. The method includes storing map data on a server, the map data defining objects appearing in the map and comprising vector coordinates of the objects in a predetermined frame of reference. Upon receiving at the server a request from the client device to provide a map of an area along a route on which a user of the client device is to travel, a heading of travel of the user on the route is determined, and the vector coordinates are transformed on the server into a rotated frame of reference, which is approximately aligned with the heading of the user. A portion of the map data corresponding to the area along the route and including the transformed vector coordinates is downloaded to the client device from the server. An image of the area of the map in the rotated frame of reference is rendered on the client device, based on the downloaded map data.

SUMMARY OF THE INVENTION

Embodiments of the present invention provide methods and systems for determining a map location requested by a user. The user typically enters a search query comprising one or more query terms that describe the requested map location.

A search engine attempts to match the query terms to map objects stored in an object database. The database holds a plurality of map objects with respective verbal descriptors and loci (typically expressed as a range or collection of map coordinates) of the objects. The search engine identifies in the object database one or more map objects whose descriptors contain terms that match at least one of the query terms. The search engine then processes the loci of the matched map objects to determine the requested map location, typically by finding an area of overlap of the loci.

In some embodiments, the matched map objects are rendered onto a common grid using the coordinates of the loci. Each grid is assigned a cumulative score according to the number of matched map objects that overlap the grid cell. The grid cell having the highest cumulative score is determined to be the requested map location.

In some embodiments, the search engine is part of a mobile navigation system that accepts search queries and displays navigational information to the user, such as a requested map location or a recommended driving route.

In some embodiments, the search query is entered as free text, thus reducing the amount of text to be entered by the user. Generally, the order in which the query terms appear in the query is insignificant. The search engine may apply an approximate string matching process when comparing the verbal descriptors of the map objects to the query terms. The use of approximate string matching provides tolerance to spelling mistakes and data entry errors. The free text interface and the use of approximate string matching make the methods and systems described herein particularly suitable for implementation in mobile terminals having limited interface capabilities, such as personal digital assistants (PDAs) and mobile phones.

There is therefore provided, in accordance with an embodiment of the present invention, a computer-implemented method for determining a requested map location, including:

providing a database holding a plurality of map objects having respective descriptors and loci;

accepting a search query including one or more query terms that describe the requested map location;

identifying in the database one or more matched map objects such that the respective descriptors of the matched map objects each match at least one of the query terms; and processing the respective loci of the matched map objects to determine the requested map location.

In an embodiment, identifying the one or more matched map objects includes identifying at least two matched map objects, and processing the respective loci includes identifying an area of overlap of the loci as the requested map location. In another embodiment, identifying the area of overlap includes rendering the respective matched map objects onto a common grid using the loci, identifying grid cells overlapped by at least one of the rendered map objects, assigning respective scores to the identified grid cells based on a number of the matched map objects that overlap each of the identified grid cells, and determining the requested map location responsively to the scores. Assigning the scores may include assigning respective weights to the matched map objects and assigning the scores to the overlapped grid cells responsively to the weights.

In another embodiment, rendering the matched map objects to the grid includes representing the grid using a dynamic data structure so as to allocate memory only to overlapped grid cells when assigning the scores. The dynamic data structure may include one or more binary search trees.

In yet another embodiment, providing the database includes representing a first map object using first logical cells having a first area and representing a second map object using second logical cells having a second area different from the first area, and rendering the respective matched map objects onto the grid includes overlaying the first and second logical cells onto the grid cells of the common grid.

In still another embodiment, identifying the one or more matched map objects includes comparing at least some of the map objects in the database to at least one of the query terms using an approximate string matching process.

In an embodiment, accepting the search query includes accepting free text input including the one or more query terms.

In another embodiment, providing the database includes associating the map objects with respective data layers, and identifying the one or more matched map objects includes searching for the one or more matched map objects only within a subset of the data layers.

In an embodiment, the method includes displaying a map including the requested map location to a user. Additionally or alternatively, the method may include providing to a user navigational instructions for traveling to the requested map location.

There is additionally provided, in accordance with an embodiment of the present invention, apparatus for determining a requested map location, including:

a database, which is arranged to hold a plurality of map objects having respective descriptors and loci;

a user input device, which is arranged to accept a search query including one or more query terms that describe the requested map location; and a processor, which is arranged to identify in the database one or more matched map objects such that the respective descriptors of the matched map objects each match at least one of the query terms, and to process the respective loci of the matched map objects to determine the requested map location.

There is also provided, in accordance with an embodiment of the present invention, a computer software product for determining a requested map location, the product including a computer-readable medium, in which program instructions are stored, which instructions, when read by a computer, cause the computer to accept a search query including one or more query terms that describe the requested map location, to identify in a database holding a plurality of map objects having respective descriptors and loci one or more matched map objects such that the respective descriptors of the matched map objects each match at least one of the query terms, and to process the respective loci of the matched map objects to determine the requested map location.

The present invention will be more fully understood from the following detailed description of the embodiments thereof, taken together with the drawings in which:

DETAILED DESCRIPTION OF EMBODIMENTS

System Description

Figure 1:
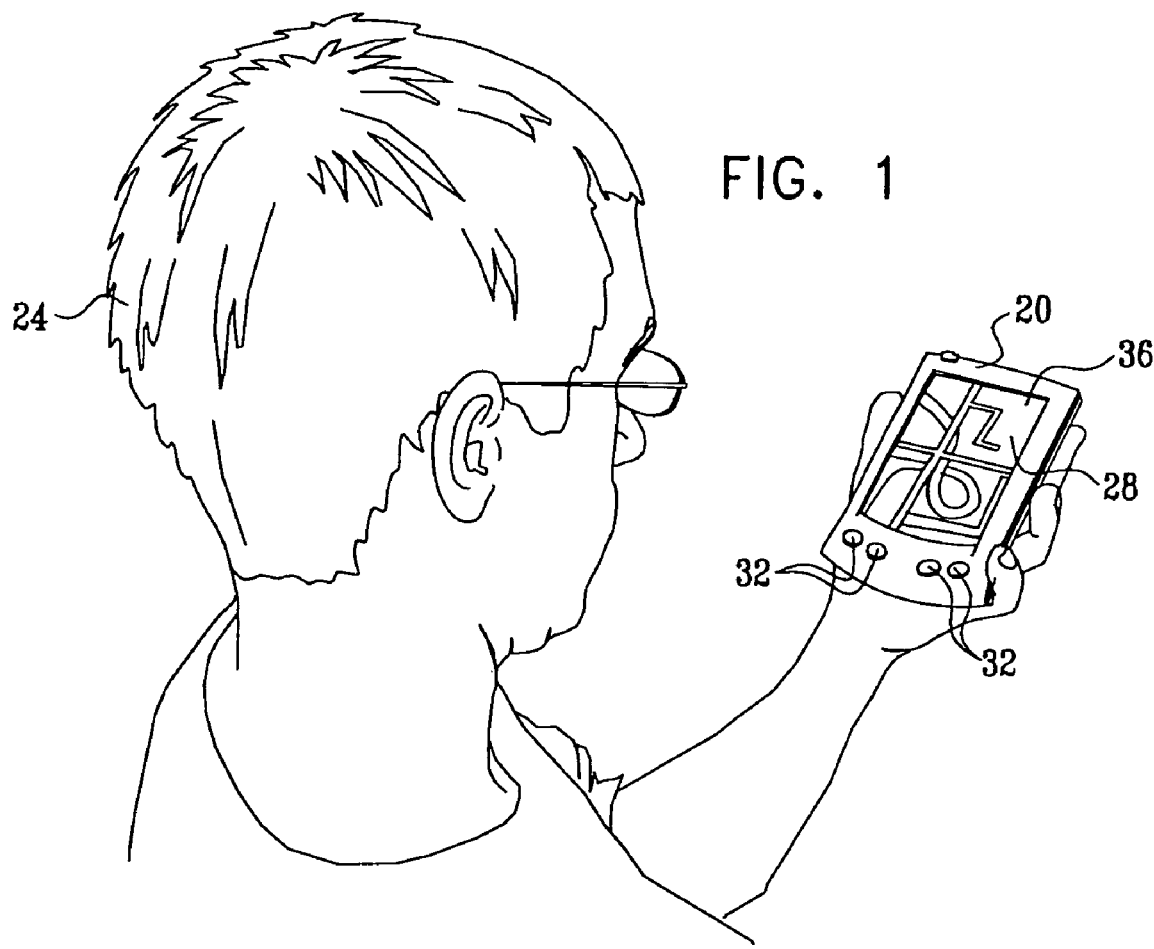
FIG. 1 is a schematic pictorial illustration of a mobile navigation terminal, in accordance with an embodiment of the present invention.

FIG. 1 is a schematic pictorial illustration of a mobile navigation terminal 20, in accordance with an embodiment of the present invention. Terminal 20 interacts with a user 24 and displays navigational information requested by the user, such as a map 28 or a recommended navigation route. In a typical transaction, user 24 inputs a search query that describes a particular map location, using a user input device 32. Device 32 may comprise a keyboard, keypad or any other suitable input means of terminal 20. Terminal 20 processes the search query using methods and systems which are described hereinbelow and displays a map showing the vicinity of the requested map location on a display 36 of terminal 20.

Additionally or alternatively, terminal 20 may display other types of navigational information based on search queries entered by the user. For example, the user may request terminal 20 to display a recommended driving route between an origin map location and a destination map location. In these embodiments, the user inputs two search queries defining the origin and destination map locations. Terminal 20 then processes the search queries and displays on display 36 a recommended navigation route between the origin and the destination.

The exemplary embodiment of terminal 20 shown in FIG. 1 is implemented using a portable digital assistant (PDA). The methods and devices described herein can alternatively be implemented using a mobile phone, a laptop computer or any other suitable mobile computing platform. The methods described herein reduce the amount of data that should be entered by the user in order to specify the desired map locations. The methods are also tolerant to errors in the input data. As such, the methods described herein are particularly suitable for implementing in computing platforms having only basic user input devices, such as mobile phones and PDAs. These methods are also particularly suitable for use in a mobile environment, such as when the user is driving, because they reduce the time and attention needed for data entry.

Figure 2A:
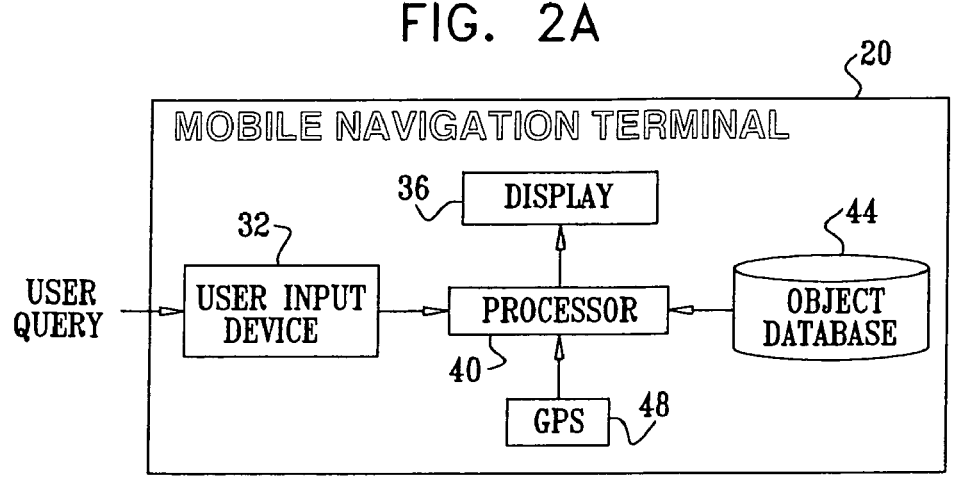
FIG. 2A is a block diagram that schematically illustrates a mobile navigation terminal, in accordance with an embodiment of the present invention.

FIG. 2A is a block diagram that schematically illustrates mobile navigation terminal 20, in accordance with an embodiment of the present invention. Terminal 20 comprises a processor 40, which performs the methods described hereinbelow, as well as the different management functions of terminal 20. Terminal 20 comprises an object database 44, which holds a plurality of map objects and additional information associated with these objects. The search methods described herein search the objects in database 44 to determine the map location that best matches search query. The different types of map objects stored in database 44 and their use in providing navigational information to the user are described in detail below.

In some embodiments, terminal 48 comprises a global positioning system (GPS) receiver 48, which provides the current location coordinates of the terminal to processor 40. GPS receiver 48 may comprise a separate unit external to terminal 20 or be implemented as an integral part of the terminal. Terminal 20 can use the location coordinates provided by GPS receiver 48 to provide the navigational information. For example, the user may request terminal 20 to display a recommended navigation route starting from the current location of the terminal to a desired destination map location. When terminal 20 comprises GPS receiver 48, the user may input only a single search query defining the destination map location. The map location of the origin is determined using the coordinates provided by the GPS receiver.

Figure 2B:
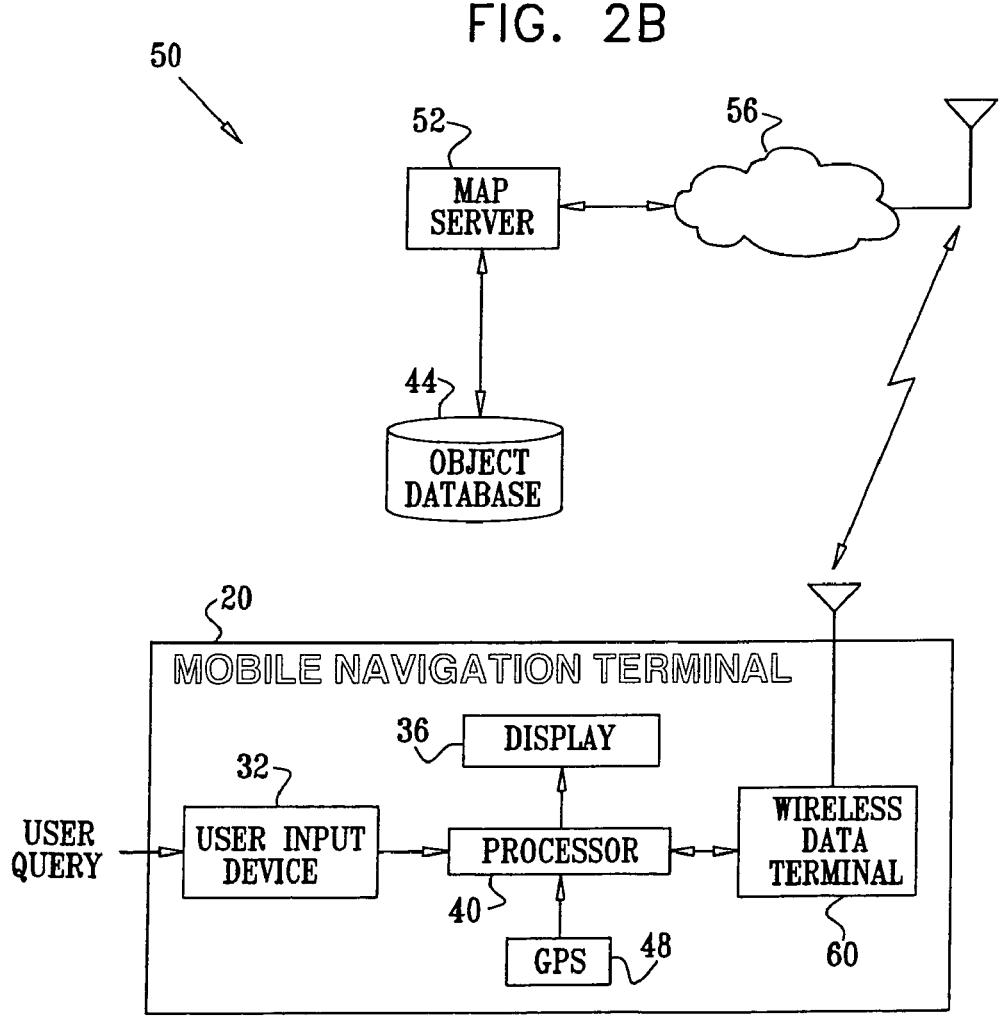
FIG. 2B is a block diagram that schematically illustrates a mobile navigation system, in accordance with an embodiment of the present invention.

FIG. 2B is a block diagram that schematically illustrates a mobile navigation system 50, in accordance with an embodiment of the present invention. In system 50, object database 44 is located remotely from terminal 20. For example, database 44 may be connected to a remote map server 52. Terminal 20 communicates with the remote map server over a network 56, which may comprise a cellular or other wireless network, a wide area network (WAN) such as the Internet, or a combination of two or more networks. Terminal 20 comprises a wireless data terminal 60, such as a cellular data terminal, a wireless local area network (WLAN) terminal or any other suitable wireless terminal, for communicating with remote map server 52. In some embodiments, the geometry-based search methods described below can be carried out by map server 52 or any other remote server in system 50, and the results provided to terminal 20.

The configurations of terminal 20 and of system 50 shown in FIGS. 1, 2A and 2B are exemplary configurations chosen for the sake of conceptual clarity. Alternative terminal and/or system configuration for implementing the methods and systems disclosed herein will be apparent to those skilled in the art after reading the present description.

Typically, processor 40 comprises a general-purpose computer, which is programmed in software to carry out the functions described herein. The software may be downloaded to the computer in electronic form, over a network, for example, or it may alternatively be supplied to the computer on tangible media, such as CD-ROM.

Geometry-Based Searching of Map Objects

The map objects stored in database 44 may comprise any object that can be displayed on a map. In the description that follows, map objects are classified according to their dimensionality to point objects, polylines and polygons. Point objects comprise zero-dimensional objects such as junctions, buildings, gas stations, hotels, restaurants and other points of interest (POI). Polylines comprise objects such as streets, railway lines and rivers, which can be represented by one or more connected linear segments. Polygons comprise two-dimensional objects such as parks, lakes, neighborhoods, cities and zip-code areas. In general, each map object is represented in database 44 in terms of the locus of the object, i.e., one or more coordinates that define the location, shape, and/or area covered by the object on the map. In some embodiments, a map object may comprise a composite object comprising a combination of polylines, polygons and/or points.

Object database 44 holds a record for each map object. The record comprises textual descriptors, such as an object name and a free text description of the object. Each textual descriptor may comprise one or more words. The record may comprise additional object attributes such as a classification of the object to a particular data layer. The record also comprises the locus of the object. For example, the record of a point object comprises the location coordinates of the object on the map. For polyline objects, the record typically comprises a sequence of location coordinates defining the endpoints of the segments of the object. For polygon objects, the record typically comprises a definition of the area of the map covered by the object. The area definition can be expressed as a sequence of coordinates defining vertices of a polygon, whose interior comprises the locus of the object.

In some embodiments, map objects are associated with specific data layers. For example, all streets may be defined as a separate layer, buildings and points of interest may be considered another separate data layer. Natural landmarks such as lakes, rivers and mountains can be classified as yet another separate data layer. The geometry-based search methods described herein enable integration of the various data layers, since the query terms entered by the user may belong to any data layer. In some embodiments, the scope of the search can be confined to a desired subset of the data layers.

When entering a search query, user 24 typically specifies the requested map location in terms of nearby map objects. The user enters a search query comprising one or more query terms. Each query term comprises a keyword that describes a map object. The keywords are typically entered as free text and are separated by spaces. Unlike some known search engines that use form-based input using categorized fields, the free text interface simplifies the data entry process and reduces the number of keystrokes required. The interface is thus particularly suitable for mobile terminals having limited interface capabilities.

Unlike some known search engines in which the search query should be entered as an address having a particular order of words (i.e., number, street, city and state in a particular order), in the methods described herein the order in which the query terms appear in the search query is generally insignificant. This aspect of free text entry is useful, for example, for tourists or other users who may be unaware of locally-used address formats.

For example, if the user wishes to display a map of the intersection of Camden street and Greenland road in London, he or she may enter the search query "CAMDEN GREENLAND." The same logic applies to two-dimensional objects as well. For example, the search query "EUSTON REGENTS" can be used to specify the part of Euston road adjacent to Regents Park in London. Although each individual query term may relate to multiple map objects and locations, the intersection of all query terms is often unique and can be used to determine the requested map location.

In some embodiments, data layers are also identified by names and/or textual descriptors. The user may enter a query term describing a particular data layer in order to search for any map objects associated with the data layer. For example, the search query "RESTAURANT RIVER," wherein both RESTAURANT and RIVER comprise names of data layers, can be used to specify a search for any restaurant that is located nearby any river. The search query "CAMDEN RIVER" can be used to search for a section of Camden street adjacent to (or crossing) a river, without explicitly naming the river. Appropriate data layer definitions can be used to search, for example, for a cinema having a nearby car park and located next to a French restaurant.

Processor 40 of terminal 20 accepts the free text search query and performs a geometry-based search process in database 44, in order to determine a map location that best matches the query terms of the search query.

FIGS. 3A-3D are diagrams that schematically illustrate an exemplary flow of the geometry-based search process, in accordance with an embodiment of the present invention. The example of FIGS. 3A-3D is typical of a search query attempting to locate the intersection of two streets, such as the "CAMDEN GREENLAND" search query described above.

After accepting the search query, processor 40 searches database 44 and collects the records of all map objects whose names or other textual descriptors match at least one of the query terms. In some embodiments, processor 40 matches the query terms against the object name. Processor 40 may also match the query terms against any of the textual descriptors, such as a free text description of the object stored in the record.

In some cases, the query terms entered by the user may comprise spelling and/or data entry errors, for example when input device 32 is non-optimal for text entry, when the user is driving or when the user is a tourist who is not accustomed to the language used in object names and descriptions. In order to enable a certain tolerance to spelling and data entry errors in the search query, processor 40 may apply an approximate string matching method when matching the query terms to object names and descriptors.

Several approximate string matching methods that can be used by processor 40 are known in the art. For example, the well known Soundex algorithm comprises a phonetic method for indexing words by their sound when pronounced in English. The Soundex algorithm is described, for example, in U.S. Pat. Nos. 1,261,167 and 1,435,663, whose disclosures are incorporated herein by reference. Another known phonetic string matching method is the Metaphone algorithm. The Metaphone method is described, for example, by Binstock and Rex in "Metaphone: A Modern Soundex," in "Practical Algorithms for Programmers," 1st Edition, Addison-Wesley, June 1995, pages 160-170, which is incorporated herein by reference. The Metaphone method is further discussed in a paper by Philips entitled "Hanging on the Metaphone," Computer Language, (7:12), December 1990, pages 9-43, which is incorporated herein by reference. Another phonetic retrieal method is described by Gadd in "PHONIX: The Algorithm," Program, (24:4), October 1990, pages 363-366, which is incorporated herein by reference.

Some known string matching methods, often referred to as N-gram similarity methods, define the similarity between two words according to the number of 1 . . . n-letter sequences common to both words. Other methods, often referred to as edit-distance methods, define the similarity between two words according to the minimum number of insertions, deletions and substitutions needed to transform one word to the other. Several known search and comparison methods are compared and evaluated in a paper by Pfeifer et al. entitled "Retrieval Effectiveness of Proper Name Search Methods," Information Processing and Management, (32:6), November 1996, pages 667-679, which is incorporated herein by reference.

Using any suitable approximate string matching method, processor 40 searches database 44 and collects the map objects whose names and/or other textual descriptors match at least one of the query terms of the search query.

Figure 3A:
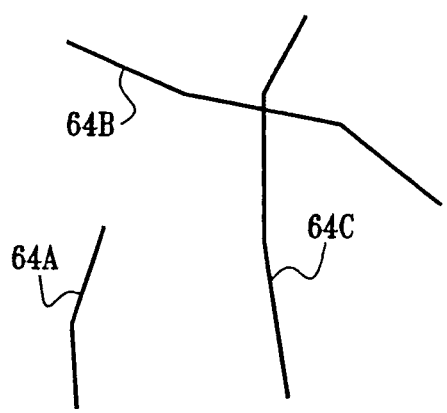
FIGS. 3A-3D are diagrams that schematically illustrate a geometry-based search process, in accordance with an embodiment of the present invention.

FIG. 3A shows three polyline objects 64A, 64B and 64C found by processor 40 to match the search query, according to the present example. These objects are referred to hereinbelow as matched objects. In principle, processor 40 processes the loci of the matched objects, in order to determine the requested map location. In some embodiments, processor 40 renders the matched map objects onto a common geometrical grid 68 using the loci of the objects stored in database 44. Grid 68 is typically pre-selected to cover the geographical area of interest.

Figure 3B:
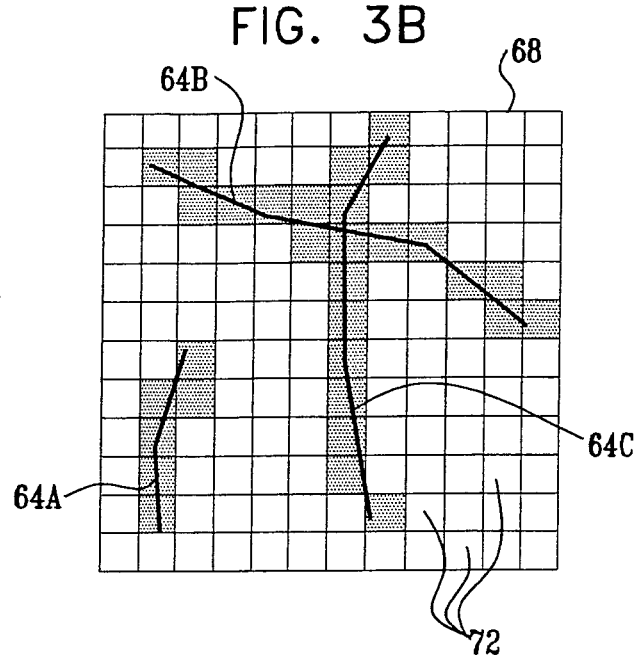

FIG. 3B shows objects 64A, 64B and 64C laid on grid 68. Grid 68 comprises an array of grid cells 72. As can be seen in the figure, each of the objects overlaps one or more of the grid cells. The grid cells overlapped by matched objects are marked by a shaded pattern in the figure.

Rendering a point object typically comprises rendering a single grid cell. In some embodiments, a point object is defined as having a locus that covers several grid cells. In such embodiments, the appropriate number of grid cells is rendered onto the grid. Rendering a polyline object typically comprises rendering each of its segments. Several suitable line rendering methods that can be used for this purpose are known in the art, such as, for example, the Bresenham line drawing algorithm, described by Bresenham in "Algorithm for Computer Control of a Digital Plotter," IBM Systems Journal, 4(1), 1965, pages 25-30, which is incorporated herein by reference.

Rendering polygon objects can be implemented using any suitable polygon rendering method known in the art, such as, for example, scan-line methods that use active edge tables. An exemplary polygon rendering method is described by Bouknight in "A Procedure for Generation of Three-Dimensional Half-Toned Computer Graphics Presentations," Communications of the ACM, (13:9), September 1970, pages 527-536, which is incorporated herein by reference.

Figure 3C:
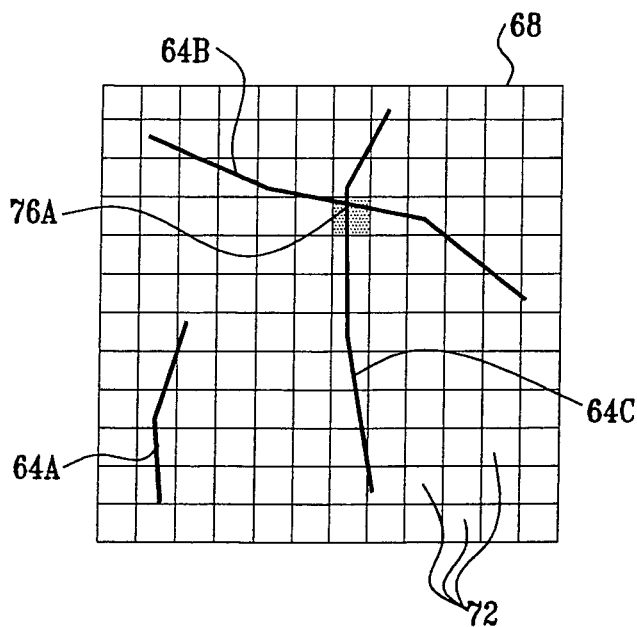

In some cases, certain grid cells are overlapped by more than a single matched object. For example, FIG. 3C shows a grid cell 76A that is overlapped by both objects 64B and 64C. In principle, grid cells that are overlapped by a higher number of matched map objects are considered more relevant to the search query, and vice versa. In order to estimate the relevance of different grid cells to the search query, each overlapped grid cell is assigned a cumulative score indicating the number of matched map objects that overlap the cell. Grid cells that are overlapped by a larger number of matched map objects will thus receive a higher score.

In some embodiments, each map object is assigned a weight value indicating its significance to the search process. In these embodiments, the weight of each overlapping object is added to the cumulative score of the grid cells it overlaps. Thus, different map objects can be defined so as to contribute different weights to the cumulative scores.

After all matched map objects are rendered onto the grid and all cumulative scores are assigned, processor 40 identifies the grid cell having the highest cumulative score and identifies it as the map location requested by the search query. In the present example, grid cell 76A is the only grid cell overlapped by two objects. All other overlapped grid cells are overlapped by a single object. Thus, processor 40 identifies grid cell 76A as the requested map location.

Figure 3D:
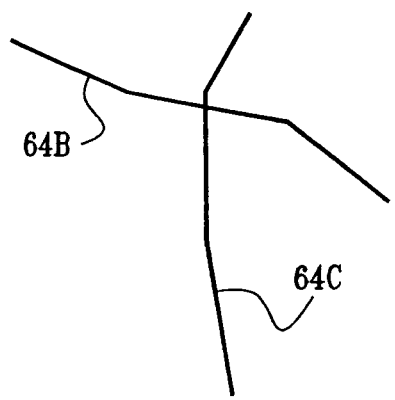

In some embodiments, processor 40 retains and displays the matched map objects that overlap the requested map location, and discards the remaining matched objects. For example, FIG. 3D shows only matched objects 64B and 64C that overlap grid cell 76A. Object 64A, which does not relate to the requested map location, is discarded.

In some cases, matching the query terms with the map objects in database 44 may produce only a single matched map object. In such cases, the locus of the single matched map object is typically regarded as the requested map location. The single object may be rendered onto grid 68 and the grid cells overlapped by the object returned as the requested map location.

Figure 4A:
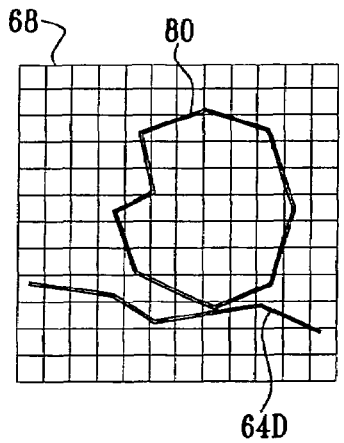
FIGS. 4A-4C are diagrams that schematically illustrate a geometry-based search process, in accordance with another embodiment of the present invention.
Figure 4B:
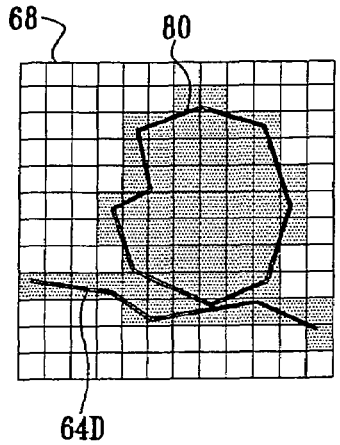
Figure 4C:
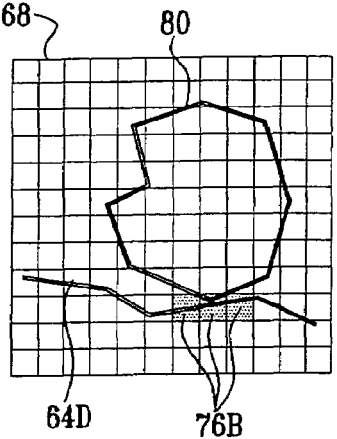

FIGS. 4A-4C are diagrams that schematically illustrate another exemplary flow of the geometry-based search process, in accordance with an embodiment of the present invention. The example of FIGS. 4A-4C is typical of a search query attempting to locate a section of a street adjacent to a park or a lake, such as the "EUSTON REGENTS" search query described above. Note that the map objects corresponding to a street and a lake are typically associated with different data layers.

FIG. 4A shows a matched polyline object 64D and a matched polygon object 80, found by processor 40 to match the search query. Objects 64D and 80 are shown rendered onto grid 68. In FIG. 4B, the overlapped grid cells are marked with a shaded pattern. FIG. 4C shows three grid cells 76B that are overlapped by both objects. Grid cells 76B are assigned the highest cumulative score and are therefore regarded as the requested map location.

As demonstrated by FIG. 4C, in some cases multiple grid cells may receive the same maximum cumulative score. In some embodiments, when the maximum-score grid cells are sufficiently close to one another, they may be collectively regarded as the requested map location. Otherwise, when processor 40 identifies two or more alternative maximum-score grid cells, all respective map locations may be displayed to the user, either as text or as a map display. The user may be asked to select the desired map location to be displayed out of the alternative results. Additionally or alternatively, processor 40 may request the user to enter additional information (e.g., an additional query term) for resolving the ambiguity. The search process is then refined using the additional query term. The refining process can be repeated until a single result is obtained.

In some embodiments, the search process described above provides an estimated map location, whose accuracy is on the order of the grid cell size. The accuracy of the estimated map location is often insufficient for displaying the exact map location to the user or for navigating to the location. In these embodiments, resolving the desired map location with sufficient accuracy involves additional operations. For example, once the grid cell corresponding to the map location is found, all map objects overlapping the grid cell can be searched in order to accurately locate the desired map location within the cell. Additionally or alternatively, any other suitable method can be used to accurately determine the desired map location using the search results.

In general, the performance of the geometry-based search process described herein is affected by the size of grid cells 72 (i.e., the resolution of grid 68). On one hand, large-area grid cells enable the search process to identify and render matched objects located at grater distances from one another, e.g., a street that passes nearby a park but not directly adjacent to it. On the other hand, large-area grid cells produce a higher number of irrelevant results. Typically, larger (and fewer) grid cells enable faster computation time but the location accuracy of the results will often be lower.

Although grid 68 comprises identical size grid cells, different map objects may be defined using different size grid cells, to allow greater flexibility in the search process and to improve its performance. For example, map objects describing cities and neighborhoods can be defined using larger grid cells in comparison with the grid cells used for defining streets or buildings. In some embodiments, each map object is defined using "logical grid cells" whose size may vary from one object to another. When rendering the object onto the grid, each of the logical grid cells covers one or more of grid cells 72 of grid 68.

The implementation of the search process and its performance are also influenced by the size of grid 68, i.e., the geographical area represented by the grid. In some embodiments, grid 68 is implemented as a static memory array in a memory of processor 40. The term "static" means that memory is allocated to grid cells regardless of whether they are used (i.e., overlapped by a matched map object and assigned a score). Although this implementation is straight-forward, it requires a large amount of memory in order to represent the area of interest (e.g., a city) with reasonable resolution.

In many practical cases, it is desirable to reduce the memory space used by grid 68 to remain within feasible memory space requirements. Memory size reduction is desirable when the processing is performed locally in terminal 20, as well as when the processing is performed in a remote server, such as map server 52 in the configuration of FIG. 2B above. For this purpose, in some embodiments, the grid is implemented in a dynamic data structure, in which memory is allocated only to currently-used grid cells. For example, a dynamic grid can be implemented using two binary search trees, one tree for each coordinate of the grid. For example, in C language using the standard template library (STL), a dynamic grid can be defined by the definition typedef std::<map, std::map<int, float>>Grid;

Note that the std::map class is implemented using an approximately balanced red-black tree, as is known in the art. Red black trees are described, for example, by Cormen et al., in "Introduction to Algorithms," $2^{nd}$ edition, MIT Press, Massachusetts, September 2001, pages 273-277, which is incorporated herein by reference. Red-black trees are also described by Hinze in "Constructing Red-Black Trees," Proceedings of the Workshop on Algorithmic Aspects of Advanced Programming Languages (WAAAPL'99), Pans, France, September 1999, pages 89-99, which is incorporated herein by reference.

Using the dynamic binary trees, memory is allocated only to grid cells having non-zero values. The computational complexity of adding a new grid cell or of updating the score of a grid cell is $O(\log[n])$, wherein n denoted the total number of grid cells in the grid. The following exemplary code creates a grid object denoted grid, and adds a grid cell having the coordinates (10, 10) and a score of 0.5:

Grid grid;
int x=10, y=10;
grid[x][y]=0.5f;

Geometry-Based Search Method Description

Figure 5:
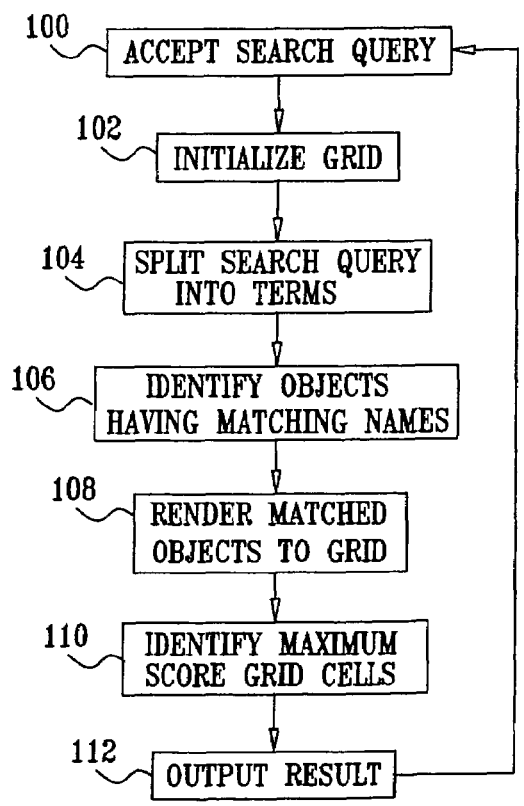
FIG. 5 is a flow chart that schematically illustrates a method for performing a geometry-based search, in accordance with an embodiment of the present invention.

FIG. 5 is a flow chart that schematically illustrates a method for performing a geometry-based search, in accordance with an embodiment of the present invention. The description that follows assumes that the method is carried out by processor 40 of terminal 20. In alternative embodiments, the method can be carried out by a server located remotely from terminal 20, such as map server 52 in FIG. 2B.

The method begins with terminal 20 accepting a search query from user 24 via input device 32, at an input step 100. Processor 40 of terminal 20 initializes grid 68, at an initialization step 102. Processor 40 splits the search query into individual query terms, at a term generation step 104.

Processor 40 now scans object database 44 and collects all map objects whose name or other textual descriptors match at least one of the query terms, at a search step 106. The matching of object names and descriptors to query terms can use an approximate string matching process, such as one of the processes cited above, in order to provide tolerance to spelling and data entry errors.

Processor 40 renders the matched map objects onto grid 68, at a rendering step 108. During the rendering process, processor 40 accumulates the cumulative scores of grid cells overlapped by the rendered map objects, as demonstrated in the examples of FIGS. 3A-3D and 4A-4C above. Processor 40 identifies the grid cell having the maximum cumulative score, at a result identification step 110. Processor 40 outputs the requested map location, at an output step 112. Typically, processor 40 displays map 28 of the vicinity of the requested map location on display 36 to user 24. The method then loops back to input step 100 for accepting another search query from the user.

In some embodiments, the geometry-based search process can be used in a process of recommending to the user a navigation route between requested origin destination map locations.

Figure 6:
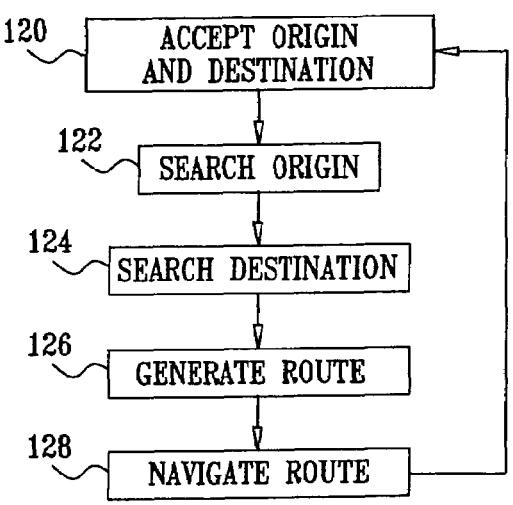
FIG. 6 is a flow chart that schematically illustrates a method for navigation using geometry-based searching, in accordance with an embodiment of the present invention.

FIG. 6 is a flow chart that schematically illustrates a method for navigation using geometry-based searching, in accordance with an embodiment of the present invention. The method begins with terminal 20 accepting two separate search queries, respectively defining the origin and destination map locations, at a query acceptance step 120.

Processor 40 performs a geometry-based search process to determine the origin map location, at an origin search step 122. Processor 40 then performs another geometry-based search process to determine the destination map location, at a destination search step 124. Both search processes typically follow the method of FIG. 5 above.

After determining the origin and destination map location, processor 40 determines the recommended navigation route between them, at a route generation step 126. Any suitable method for generating the recommended route can be used for this purpose. Processor 40 then displays the route to the user, typically as a sequence of maps and driving directions displayed on display 36. The processor may provide any other suitable type of navigational instructions for traveling to the destination map location.

The specific methods used for route generation and map display in the methods of FIGS. 5 and 6 are considered outside the scope of the present patent application. Exemplary methods for providing and displaying maps on a mobile terminal are described, for example, in the above cited references. Additional methods for displaying a map that includes a plurality of layers is described in U.S. Pat. No. 6,904,360, whose disclosure is incorporated herein by reference.

User 24 navigates the recommended route, at a navigation step 128. In some embodiments, terminal 20 uses the coordinates measured and provided by GPS receiver 48 to verify that user 24 actually follows the recommended route. Processor 40 may provide corrections and additional driving directions, as appropriate.

Although the embodiments described herein mainly refer to geometry-based searching in mobile navigation systems, the disclosed methods and systems can be used in any application that involves identification of map location or objects based on user queries. Such applications may comprise, for example, web-based mapping and location finding systems. Although the search method described above process the loci of the matched objects by rendering the objects onto a common grid, any other suitable method can be used. For example, various geometrical distance functions can be defined based on the loci of map objects.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for determining a requested map location, comprising:
providing a database holding a plurality of map objects having respective descriptors and loci;
accepting a search query comprising one or more query terms that describe the requested map location;
identifying in the database two or more matched map objects such that the respective descriptors of the matched map objects each match at least one of the query terms;
rendering the matched map objects onto a common grid using the loci;
identifying grid cells overlapped by at least one of the rendered map objects;
assigning respective scores to the identified grid cells based on a number of the matched map objects that overlap each of the identified grid cells; and
determining the requested map location responsively to the scores.

2. The method according to claim 1, wherein assigning the scores comprises assigning respective weights to the matched map objects and assigning the scores to the overlapped grid cells responsively to the weights.

3. The method according to claim 1, wherein rendering the matched map objects to the grid comprises representing the grid using a dynamic data structure so as to allocate memory only to overlapped grid cells when assigning the scores.

4. The method according to claim 3, wherein the dynamic data structure comprises one or more binary search trees.

5. The method according to claim 1, wherein providing the database comprises representing a first map object using first logical cells having a first area and representing a second map object using second logical cells having a second area different from the first area, and wherein rendering the respective matched map objects onto the grid comprises overlaying the first and second logical cells onto the grid cells of the common grid.

6. The method according to claim 1, wherein identifying the two or more matched map objects comprises comparing at least some of the map objects in the database to at least one of the query terms using an approximate string matching process.

7. The method according to claim 1, wherein accepting the search query comprises accepting free text input comprising the one or more query terms.

8. The method according to claim 1, wherein providing the database comprises associating the map objects with respective data layers, and wherein identifying the two or more matched map objects comprises searching for the two or more matched map objects only within a subset of the data layers.

9. The method according to claim 1, and comprising displaying a map comprising the requested map location to a user.

10. The method according to claim 1, and comprising providing to a user navigational instructions for traveling to the requested map location.

11. The method according to claim 1, wherein the map objects comprise streets having respective street names, and wherein at least one of the query terms comprises at least a part of a street name.

12. Apparatus for determining a requested map location, comprising:
a database, which is arranged to hold a plurality of map objects having respective descriptors and loci;
a user input device, which is arranged to accept a search query comprising one or more query terms that describe the requested map location; and
a processor, which is arranged to identify in the database two or more matched map objects such that the respective descriptors of the matched map objects each match at least one of the query terms, to render the respective matched map objects onto a common grid using the loci, to identify grid cells overlapped by at least one of the rendered map objects, to assign respective scores to the identified grid cells based on a number of the matched map objects that overlap each of the identified grid cells, and to determine the requested map location responsively to the scores.

13. The apparatus according to claim 12, wherein the processor is arranged to assign respective weights to the matched map objects and to assign the scores to the overlapped grid cells responsively to the weights.

14. The apparatus according to claim 12, wherein the processor is arranged to represent the grid using a dynamic data structure so as to allocate memory only to overlapped grid cells when assigning the scores.

15. The apparatus according to claim 14, wherein the dynamic data structure comprises one or more binary search trees.

16. The apparatus according to claim 12, wherein the processor is arranged to represent a first map object using first logical cells having a first area, to represent a second map object using second logical cells having a second area different from the first area, and to render the respective matched map objects onto the grid by overlaying the first and second logical cells onto the grid cells of the common grid.

17. The apparatus according to claim 12, wherein the processor is arranged to compare at least some of the map objects in the database to at least one of the query terms using an approximate string matching process so as to identify the two or more matched map objects.

18. The apparatus according to claim 12, wherein the user input device is arranged to accept free text input comprising the one or more query terms.

19. The apparatus according to claim 12, wherein the map objects in the database are associated with respective data layers, and wherein the processor is arranged to identify the two or more matched map objects only within a subset of the data layers.

20. The apparatus according to claim 12, and comprising a display, which is arranged to display a map comprising the requested map location to a user.

21. The apparatus according to claim 12, wherein the processor is arranged to provide to a user navigational instructions for traveling to the requested map location.

22. The apparatus according to claim 12, wherein the map objects comprise streets having respective street names, and wherein at least one of the query terms comprises at least a part of a street name.

23. A computer-readable medium storing program instructions, the program instructions configured to perform a method for determining a requested map location when executed on a computer, said method comprising:

accepting a search query comprising one or more query terms that describe the requested map location, identifying in a database holding a plurality of map objects having respective descriptors and loci one or more matched map objects such that the respective descriptors of the matched map objects each match at least one of the query terms, rendering the respective matched map objects onto a common grid using the loci, identifying grid cells overlapped by at least one of the rendered map objects, assigning respective scores to the identified grid cells based on a number of the matched map objects that overlap each of the identified grid cells, and determining the requested map location responsively to the scores.

24. The computer-readable medium according to claim 23, wherein the map objects comprise streets having respective street names, and wherein at least one of the query terms comprises at least a part of a street name.

* * * * *